United States Patent
Yost

(10) Patent No.: US 10,268,049 B1
(45) Date of Patent: Apr. 23, 2019

(54) EYE WEAR RETAINER SYSTEM

(71) Applicant: Tim Yost, Mio, MI (US)

(72) Inventor: Tim Yost, Mio, MI (US)

(*) Notice: Subject to any disclaimer, the term of this patent is extended or adjusted under 35 U.S.C. 154(b) by 434 days.

(21) Appl. No.: 13/773,783

(22) Filed: Feb. 22, 2013

Related U.S. Application Data

(60) Provisional application No. 61/606,164, filed on Mar. 2, 2012.

(51) Int. Cl.
G02C 3/00 (2006.01)

(52) U.S. Cl.
CPC .................. G02C 3/006 (2013.01)

(58) Field of Classification Search
CPC . G02C 1/06; G02C 11/00; G02C 3/02; G02C 3/003; G02C 5/00; G02C 5/143; G02C 5/22; G02C 3/006
USPC ............ 351/154–158, 41, 111, 121
See application file for complete search history.

(56) References Cited

U.S. PATENT DOCUMENTS

| | | | | |
|---|---|---|---|---|
| 6,053,612 A * | 4/2000 | MacIntosh et al. | | 351/157 |
| 6,182,334 B1 * | 2/2001 | Davancens | | 24/3.3 |
| 7,075,007 B2 * | 7/2006 | Auray et al. | | 174/668 |
| 7,845,795 B2 * | 12/2010 | Williams | | 351/156 |
| 2008/0256979 A1 * | 10/2008 | Okamura | | 63/3.1 |
| 2010/0283961 A1 | 11/2010 | Williams | | |
| 2011/0058140 A1 * | 3/2011 | Williams | | 351/156 |

* cited by examiner

*Primary Examiner* — Jie Lei
(74) *Attorney, Agent, or Firm* — Jerry Semer

(57) ABSTRACT

The article of manufacture is cable with a rubberized outer coating. The cable has sufficient stiffness that it resists being bent. Two retainers with openings through their middle are placed on the cable. The two retainers are tapered at the top and have a cylindrical bottom. The retainers are placed on the cable with the tapered tops facing each other. On the cylindrical bottom a thread opening is drilled for a set screw. The cable is thread through the center of the retainer and held in place by tightening the set screw. Over the cylindrical bottom of the retainers a rubber tube is placed. The tube is held in place by machined barbs. To use the invention one takes the tubes and places them over the eyeglasses' temples. Then the individual takes the invention with the eyeglasses and places it over his head.

9 Claims, 2 Drawing Sheets

EYE WEAR RETAINER SYSTEM

This application is a continuation-in-part of prior application No. 61/606,164 that was filed on Mar. 2, 2012.

FIELD OF INVENTION

This invention relates to the field of retainers of eyeglasses that allow an individual to remove his eyeglasses and place the eyeglasses in an easily retrieval position that also enables the individual to go about his work without being encumbered by the eyeglasses, and more particularity to the field of eyewear retainers that extend around rear of a person head and neck and when the eyeglasses are not in use the eyeglasses rest upon the chest.

BACKGROUND OF THE INVENTION

Since the invention of eyeglasses individual have be looking for a way to keep track of their eyeglasses when the eyeglasses were not in place on the head. There are many times in life when an individual who wears eyeglasses wishes to not have the eyeglasses in place on the head but wishes to carry the eyeglasses in a place that can be easily accessed in order to easily place the eyeglasses on their head. This is especially true for sunglasses and reading eyeglasses. Neither of these types of eyeglasses are meant to be worn full time. However, it is necessary to have the eyeglasses somewhere quick for retrieval and wearing.

There have been numerous attempts to solve this problem. These include strings that are tied to the eyeglasses, chains that are attached to eyeglasses, specially made pockets, specially made containers that clips to the individuals' belt or shirt, etc. One of the attempts to solve this problem has been a cloth that fits over the eyeglasses temples and slips around the back of the head. This solution has several problems for athletes, fishermen, skiers, hunters, and swimmers. First the retaining medium that fits around the head must be short. An individual who is participating in physical activity will need a retainer that will not get tangled in one's collar, shirt, or buttons. To achieve this goal applicant has used a stainless steel cable that is able to retain its shape. Thus, since the cable resist deflection it will not get tangled in clothing.

Second, individuals who partake in outdoor activities tend to sweat and use suntan lotion and would tend to soil a cloth lanyard. To eliminate this problem applicant has covered the stainless steel cable with a coating that repels sweat and dirt. Sweat and dirt can easily be wiped off the coating. The coating also will not be stain by sweat and dirt. Since the retention device will be heavily used by individuals in the activities it must be well-made and impervious to breaking. Also it must be designed for outdoor use. It cannot corrode or be damaged by the environment. It also must be made from a material that does not cause an allergic reaction. This is achieved by the stainless steel components.

Since, the device is designed for active individuals who are working or playing outdoors, the device must be able to withstand a great deal of stress. It also is necessary to be easily manufactured. To achieve these goals, applicant's device has unique features. First the device is made of stainless steel, anodized aluminum and rubber. These compounds ensure against corrosion and are made to withstand even the toughest use. The compounds ensure the device will last. The compounds also enable the inventor to easily and cheaply manufacture the device.

SUMMARY OF INVENTION

The article of manufacture is a stainless steel cable approximately 18 inches in length that is rubberized to produce a smooth outer coating. The outer coating is designed to shed sweat and grime. The cable has sufficient stiffness that it resists being bent. Upon deflection it will return to its original shape. The stainless steel cable will not corrode and will retain its shape under all weather conditions.

Two retainers with openings through their middle are placed on the cable. The two retainers are tapered at the top and have a cylindrical bottom. The retainers are placed on the cable with the tapered tops facing each other. The tapered top forms a ridge above the cylindrical bottom. Under the ridge on the cylindrical bottom a thread opening is drilled for a set screw. The cable is thread through the center of the retainer to a point where it aligns with the end of the cylindrical bottom of the retainer. The cable is held in place by tightening the set screw.

The two retainers are made of anodized aluminum. Over the cylindrical bottom of the retainers a rubber tube is placed. The tube extends approximately a half inch past the bottom of the retainer. The tube is held in place securely by machined barbs To use the invention one takes the individual tubes on the ends of the cable and places them over the eyeglasses' temples. This holds the eyeglasses securely to the invention. Then the individual takes the invention with the eyeglasses and places over his head so that the eyeglasses fall up on his chest. When an individual wishes to place the eyeglasses over his eyes he just retrieves the eyeglasses from his chest and puts them in place. He can then take the eyeglasses off at any time and the eyeglasses will stay securely hanging on his chest.

DETAILED DESCRIPTION OF THE PREFERRED EMBODIMENT

Figure 2:
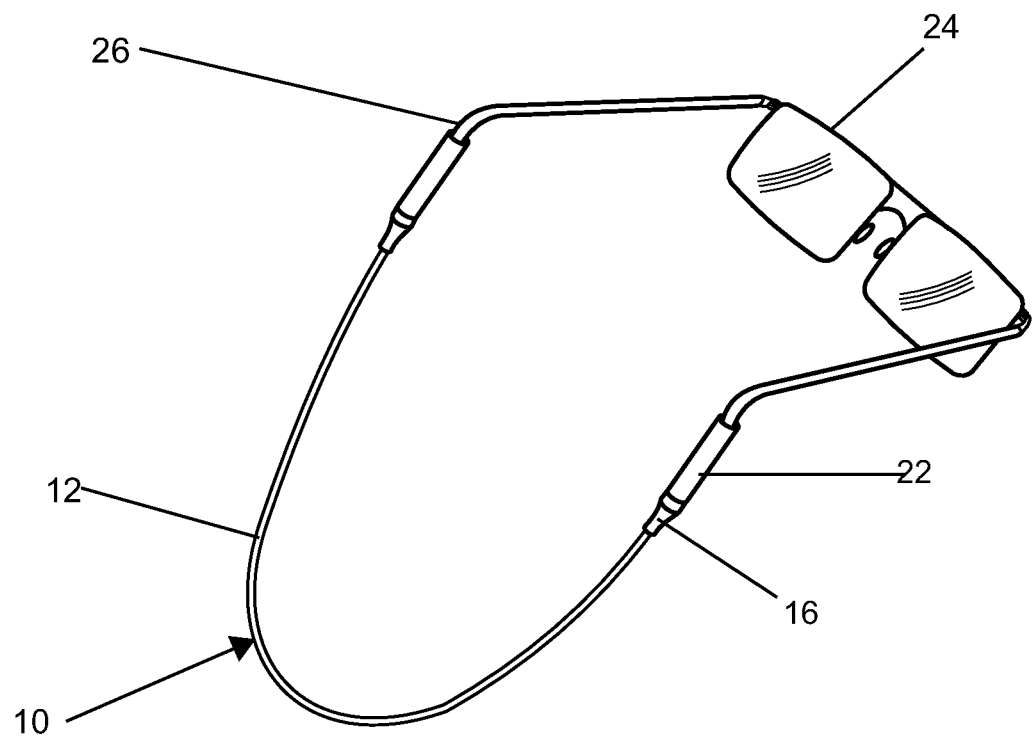
FIG. 2 is a perspective view of the invention attached to eyeglasses.

FIG. 2 is a perspective view of the invention 10. FIG. 2 shows the cable 12. In the preferred embodiment the cable 12 is made of stainless steel cable. This makes the cable 12 long-lasting and resistant to corrosion. It also produces a cable 12 of sufficient stiffness that when bent will return to its original configuration. The cable 12 is covered with a rubberized outer sheath 14. This sheath 14 is sufficiently smooth so that it will not get caught on clothes or irritate one's skin. The cable repels sweat and dirt and can easily be wiped off and will not stain. The rubberlike sheath 14 and the cable 12 are made out of materials that will not be affected by weather conditions or an individual's sweat.

Figure 3:
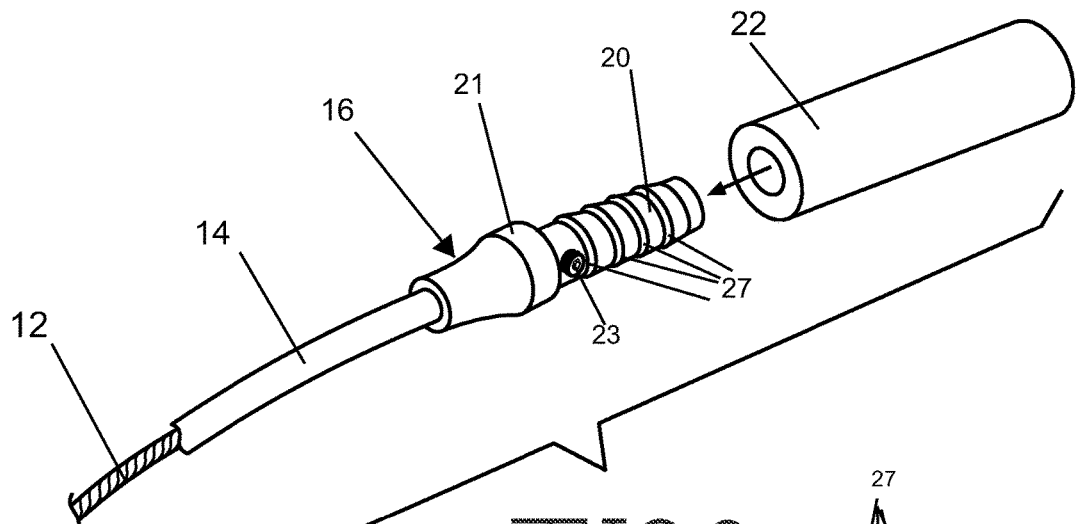
FIG. 3 is a view of one end of the eyeglass retainer with the tube exploded off the end.
Figure 4:
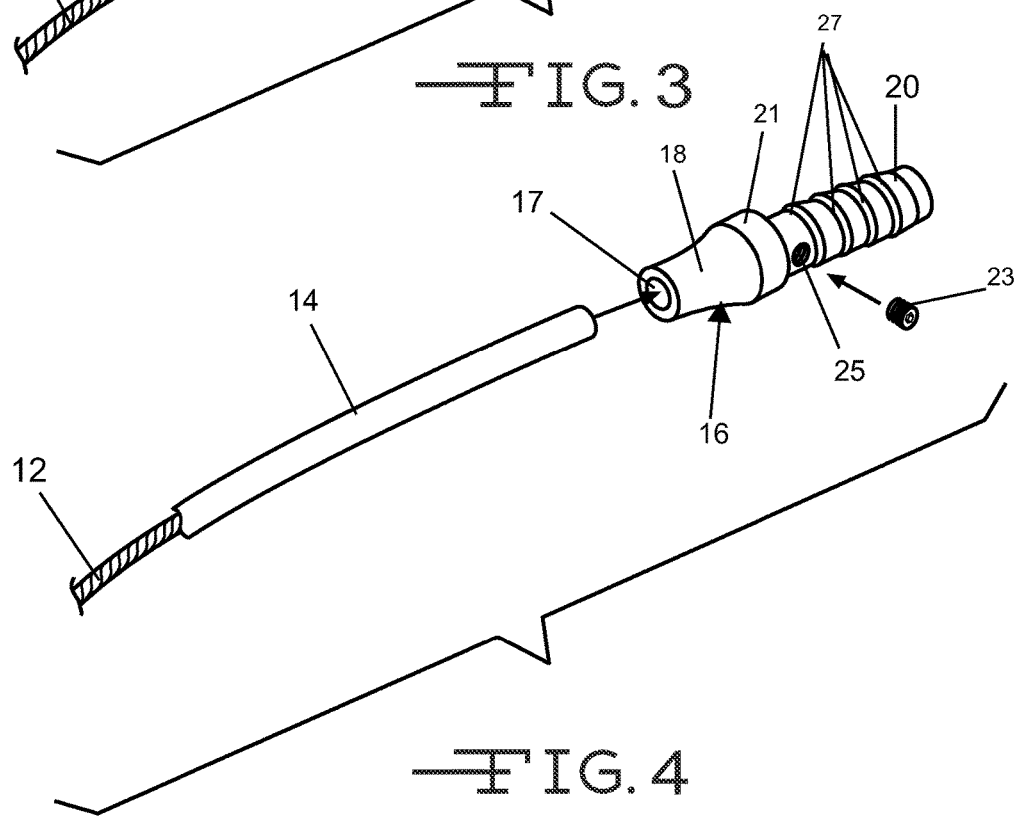
FIG. 4 is an exploded view of the end of the eyeglass retainer of FIG. 3.

On the cable 12 are retainers 16. The retainers 16 have a tapered top 18. The retainers 16 also have a cylindrical bottom 20 as seen in FIGS. 3 and 4. Through the middle of the retainer 16 is an opening 17 that is of sufficient size for the cable 12 to pass through. The two retainers 16 are placed on the cable with their tops 18 adjacent to each other. The two retainers 16 are moved to the end of the cable 12. In the preferred embodiment the retainers 16 are made of anodized aluminum. The tapered top 18 forms a ridge 21 above the cylindrical bottom 20. Under the ridge 21 on the cylindrical bottom 20 a thread opening 25 is drilled for a set screw 23. The cable 12 is thread through the center of the retainer to a point where it aligns with the end of the cylindrical bottom 20 of the retainer 16. The cable 12 is held in place by tightening the set screw 23.

On each end of the cable 12 over the bottom of cylindrical bottom 20 of the retainer 16 a tube 22 of approximately an inch is placed. This tube 22 is held in place on the cylindrical portion 20 of the retainers 16 by friction and a set of machined barbs 27. The tube in the preferred embodiment is made of rubber.

Figure 1:
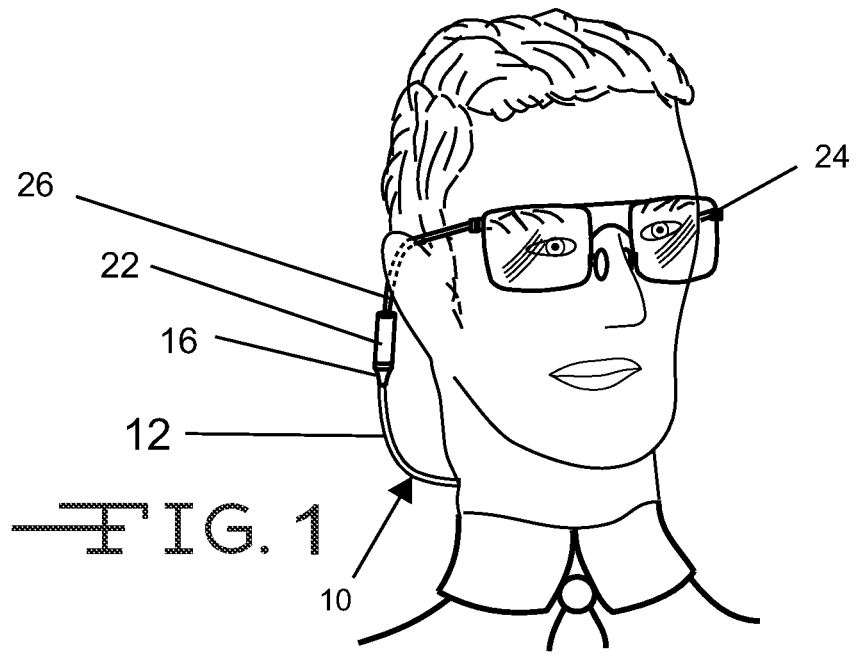
FIG. 1 is a view of the invention in place upon a human body.

The invention 10 is used by an individual attaching his eyeglasses 24 to the invention 10. An individual first places the tubes 22 over the temples 26 of the eyeglasses 24. The tube 22 is made out of material that has a high coefficient of friction so that when it is placed over the cylindrical retainer 16 and the eyeglasses temples 26, it will securely stay in place. The combination of the eyeglasses 24 with the invention 10 is shown in FIGS. 1 and 2. The combination of the eyeglasses 24 with invention 10 is then placed over the individuals head and the eyeglasses 24 come to rest on the individual's chest. The cable 12 rests on the individual's neck. In this position an individual can easily grasp with either hand the eyeglasses 24 and place them in position for sight. The individual can also easily remove the eyeglasses 24 and let them fall to his chest. The individual always knows where his eyeglasses 24 are and can easily replace them on his eyes.

I claim:

1. An eyewear retainer comprising:
   a. a cable that is of sufficient stiffness that it will resist being bent and upon deflection will return to its original shape; and,
   b. a coating on the cable; and,
   c. two cylindrical tube retainers and each cylindrical tube retainer has two ends and a ridge near one of the ends, said cylindrical tube retainers have a lengthwise opening that passes through each cylindrical tube retainers from one end to the other, said lengthwise opening is slightly larger in diameter than the diameter of the cable and each cylindrical tube retainer has a threaded opening in its side that pass through the side of each cylindrical tube retainer to the lengthwise opening and said threaded opening is located near the ridge; and,
   d. two tubes and each tube's diameter is sufficient to fit tightly over the end opposite the end with the ridge of the cylindrical tube retainers and tightly over the eyeglass's temples; and,
   e. the tubes are made out of material that has a high coefficient of friction so that when they are placed over the cylindrical tube retainers and the eyeglasses temples they will hold the glasses and the eyewear retainer security together; and,
   f. two set screws that threads within the threaded openings that pass through the side of the cylindrical tube retainers; and,
   g. wherein the cable runs through the lengthwise openings in the cylindrical tube retainers a sufficient distance to pass under the threaded openings that pass through the side of the cylindrical tube retainers containing the set screws and the set screws are tightened against the cable to hold the cylindrical tube retainers against the cable.

2. An eyewear retainer as in claim 1 wherein:
   a. the cable will not corrode.

3. An eyewear retainer as in claim 1 wherein:
   a. the cable is made of stainless steel wire.

4. An eyewear retainer as in claim 1 wherein:
   a. the coating sheds sweat and grime.

5. An eyewear retainer as in claim 1 wherein:
   a. the cylindrical tube retainers are made of anodized aluminum.

6. An eyewear retainer as in claim 1 wherein:
   a. the end of the cylindrical tube retainer over which the tube is placed is barbed to hold the tube more securely in place.

7. An eyewear retainer as in claim 1 wherein:
   a. the tubes are made of rubber.

8. A method of use of the eyeglass retainer of claim 1 comprising the steps of:
   a. placing the means for attaching the eyeglass retainer over both the eyeglass temples; and,
   b. placing the cable of the eyeglass retainer over one's head and against ones back of neck such that the eyeglasses fall upon one's chest.

9. An eyewear retainer as in claim 1 wherein:
   a. the cylindrical tube retainers are made from a substance that can be drilled and machined and openings within can be threaded.

* * * * *